United States Patent [19]
Zarybnicky, Sr. et al.

[11] Patent Number: 5,825,287
[45] Date of Patent: Oct. 20, 1998

[54] VEHICLE BRAKE MONITORING SYSTEM

[75] Inventors: Richard F. Zarybnicky, Sr.; Alan C. Lesesky; Ronald S. Plantan, all of Charlotte, N.C.

[73] Assignee: Indian Head Industries, Charlotte, N.C.

[21] Appl. No.: 382,535

[22] Filed: Feb. 2, 1995

[51] Int. Cl.$^6$ .................................................. B60Q 1/00
[52] U.S. Cl. ...................... 340/453; 340/454; 340/450.1; 188/1.11 E; 188/1.11 W
[58] Field of Search ..................................... 340/452, 453, 340/454, 450.1; 188/1.11 E, 1.11 W

[56] References Cited

U.S. PATENT DOCUMENTS

| | | | |
|---|---|---|---|
| 2,873,436 | 2/1959 | Avrea | 340/52 |
| 3,654,549 | 4/1972 | Maurer et al. | 324/34 D |
| 3,730,056 | 5/1973 | Swander, Jr. | 92/48 |
| 3,776,329 | 12/1973 | Hope et al. | 188/1 A |
| 3,808,593 | 4/1974 | Kopernik et al. | 340/52 A |
| 4,188,605 | 2/1980 | Stout | 338/32 H |
| 4,279,214 | 7/1981 | Thorn | 116/208 |
| 4,364,305 | 12/1982 | Dalibout et al. | 92/63 |
| 4,471,304 | 9/1984 | Wolf | 324/208 |
| 4,583,071 | 4/1986 | Sebalos et al. | 340/52 B |
| 4,642,603 | 2/1987 | Martinez, Jr. | 340/52 B |
| 4,649,370 | 3/1987 | Thomason | 340/453 |
| 4,757,300 | 7/1988 | Sebalos | 340/453 |
| 4,800,991 | 1/1989 | Miller | 188/1.11 |
| 4,824,182 | 4/1989 | Stettes et al. | 303/92 |
| 4,825,385 | 4/1989 | Dolph et al. | 364/513.5 |
| 4,855,712 | 8/1989 | Wiley, Jr. et al. | 340/453 |
| 4,883,150 | 11/1989 | Arai | 188/289 |
| 4,937,554 | 6/1990 | Herman | 340/453 |
| 4,989,537 | 2/1991 | Hutchinson, Sr. et al. | 116/208 |
| 5,044,302 | 9/1991 | Goldfein et al. | 116/208 |
| 5,140,932 | 8/1992 | Goldfein et al. | 116/208 |
| 5,178,092 | 1/1993 | Schedin | 116/208 |
| 5,213,056 | 5/1993 | Nicholls et al. | 116/208 |
| 5,226,509 | 7/1993 | Smith | 188/1.11 |
| 5,253,735 | 10/1993 | Larson et al. | 188/1.11 |
| 5,285,190 | 2/1994 | Humphreys et al. | 188/1.11 |
| 5,339,069 | 8/1994 | Penner et al. | 340/454 |
| 5,358,075 | 10/1994 | Jarzombek | 188/1.11 |
| 5,433,296 | 7/1995 | Webberley | 188/1.11 |
| 5,450,930 | 9/1995 | Martens et al. | 340/454 |
| 5,539,641 | 7/1996 | Littlejohn | 364/426.01 |
| 5,572,187 | 11/1996 | Williford | 340/454 |

FOREIGN PATENT DOCUMENTS

| | | |
|---|---|---|
| 1245190 | 7/1967 | Germany . |
| 62-286816 | 12/1987 | Japan . |
| 63-255114 | 10/1988 | Japan . |
| 1302928 | 1/1973 | United Kingdom . |
| 2232770 | 12/1990 | United Kingdom . |

*Primary Examiner*—Jeffrey Hofsass
*Assistant Examiner*—Ashok Mannava
*Attorney, Agent, or Firm*—Howard & Howard

[57] ABSTRACT

A brake condition monitoring system includes a central control receiving signals from each of the several brake actuators mounted on a vehicle. The control receives all of the signals, and sends a single signal to a display in the cab of the vehicle indicative of which of the brake actuators may be evidencing a malfunction. The signals from each brake actuators are unique such that the control can determine which brake actuator each signal is from. The control is also capable of monitoring conditions other than movement of a push rod. The control can ensure that each of the parking brakes have been fully released, the system can monitor the number of actuations for each of the brake actuators, the system can monitor whether a particular brake has been actuated for a long period of time and the system can act as a self check for each of the sensors associated with the brake actuators by monitoring which brake actuators are actuated to ensure that each of the brake actuators sends a signal indicative of an actuation. The invention further anticipates other conditions may be controlled or sensed. In further aspects of this invention, magnets associated with the push rod are mounted within a flexible sleeve mounted on the push rod. Flexible magnets are used. Switches are mounted in the housing of the brake actuators to monitor movement from the magnets. Several embodiments of systems for incorporating the unique controls into a vehicle are disclosed. The control may be mounted within the cab and associated with the display, or it may be mounted onto the body of the vehicle. In either embodiment, it is preferred that only two signal feed lines lead forwardly to the cab.

64 Claims, 7 Drawing Sheets

VEHICLE BRAKE MONITORING SYSTEM

BACKGROUND OF THE INVENTION

This application relates to a system for monitoring several conditions within an air or pneumatic applied vehicle brake system.

In the prior art, heavy duty trucks and other large vehicles are typically equipped with an air brake actuating system. The air brake actuating system applies air to a service chamber to move a diaphragm in a first direction. A push rod typically moves with the diaphragm, and the push rod is connected to a linkage that actuates the vehicle brakes. An emergency chamber is generally also attached adjacent to the service chamber, and is operable to move the push rod in the event that the air system fails. To this end, a high strength power spring is typically incorporated into the emergency chamber to actuate the push rod when there is a failure in the system air line. This spring also typically actuates the push rod when the vehicle is parked.

A brake actuator has a predetermined amount of available movement, or stroke, for the push rod. The amount of movement of the push rod required to fully actuate the brakes must be carefully monitored such that it is within the stroke of the brake actuator. The prior art has experienced situations wherein there has been an excessive amount of push rod movement for actuation of the brake system. This excessive required push rod movement can be created by any one of several factors. Typically, excessive movement is due to brake lining wear. As the brakes wear, more movement of the push rod is required to actuate the brakes. Further, as the linkages, connections, etc. between the members connecting the push rod to the brakes bend or become loose or excessively worn, additional push rod movement may be required to adequately stoke the brake. A combination of these several features may sometimes result in the amount of push rod movement required to actuate the brakes, approaching the available push rod movement, or stroke, from the brake actuator. This is, of course, an undesirable situation.

The prior art has attempted to monitor the amount of push rod movement during actuation of the brake, and provide some indication to an operator of when there is excessive push rod movement. The determination of when there is excessive push rod movement is dependent upon the designed stroke, or rated stroke, of the brake actuator. In addition, an apparatus known as a slack adjuster is typically placed between the push rod and the foundation brake. The slack adjuster is incrementally adjusted to compensate for slack in the braking system and to decrease the required push rod movement. Automatic slack adjusters are now available which automatically adjust the foundation brake system.

The prior art includes production brake actuators with a visual indication of when the push rod is experiencing excessive movement, or is approaching an out-of-stroke condition. The visual indicators may be as simple as a band of bright color on the push rod, that should not extend or be visible outwardly of the brake chamber. An operator who sees that brightly colored band is provided with an indication that the push rod is, or may soon, exceed its maximum effective stroke by moving farther than its maximum allowable stroke. Such systems have proven quite beneficial; however, with all visual systems of this sort, the operator is required to check beneath the vehicle to see the indication of excessive push rod movement.

Electronic indicator systems have been proposed in the prior art, although they have never been practically incorporated into production brake actuators. The proposed electronic systems have consisted of various electronic or magnetic sensors mounted within the brake chamber, or outwardly of the brake chamber. The sensors monitor movement of the push rod, and provide a signal to an operator when excessive movement is encountered. The prior art has suggested systems wherein each of the brake actuators includes a signal wire leading to a display in the cab of a vehicle. Alternatively, the prior art has also suggested a system wherein each of the brake actuators is connected to a single signalling device that provides a single signal to the driver that at least one brake needs adjustment. This prior art system does not identify which brake needs adjustment.

The two above described types of prior art systems have deficiencies in that the first type system would require an number of signal wires leading from the brake actuators forwardly to the cab of a vehicle. The brake actuators are mounted in a hostile environment, and the requirement of having a long signal wire leading from each of the brake actuators to the cab of the vehicle would present an opportunity for disconnection of the several long signal wires. The prior art systems typically only indicate a problem condition. Thus, a disconnected wire may not always be identified, and the operator may be given no indication of such a disconnection. The disconnected wire will simply be seen as a lack of any problem with the brake.

With the second type system, the operator would not be provided with an indication of which brake may need adjustment. It is not always visually evident which brake requires adjustment, and thus such systems do not provide all of the information that would be necessary for an operator to properly monitor and maintain the brakes on a vehicle.

Other conditions within the brake actuator and braking systems have typically not been monitored on a continuous basis. Even so, it would be beneficial to provide an operator of some indication of the status of many other conditions. As an example, the parking brakes may sometimes not fully release. In some cases, the larger power spring may not fully compress, maintaining the parking brakes partially applied. This is obviously undesirable. It would thus be beneficial to provide an operator with some indication of such a situation.

In addition, foundation brakes, slack adjusters, brake linings, and brake actuators typically have an expected life span related to a certain number of actuations of the braking system, or a certain number of slack adjuster adjustments. The prior art systems have provided no monitoring or reporting on the number of actuations of the system.

Also, certain road conditions such as a long period of driving without actuation of the brakes, or a long period of time with constant actuation of the brakes, change the temperature of the foundation brake system. With a change in the temperature of the brake lining, or other brake components, the dimensions of the brake system changes, and thus the required push rod movement to actuate the brake also changes. The proposed brake stroke monitoring systems have not accounted for the period of time that a brake may have been actuated. Thus, these systems could provide excessive indications of a brake with excessive movement, or alternatively, fail to provide an indication of an actuator with excessive stroke.

SUMMARY OF THE INVENTION

In a disclosed embodiment of this invention, a vehicle brake monitoring system comprises a plurality of brake actuators mounted on the chassis of the vehicle, with each of the brake actuators having a push rod selectively actuatable to engage a brake. For purposes of the remainder of this application and claims, the entirety of the vehicle, other than the cab, but including the chassis, the frame, and the body are referred to generically as the "body" of the vehicle. A control box receives a signal from each of the brake actuators. The signal is preferably at least indicative of the amount of movement of the push rod at each of the brake actuators. The control box may also send a signal to an automatic slack adjuster that some adjustment is necessary based upon the monitored push rod movement. The necessary slack adjuster structure to achieve such a goal is known in the art. It is the interface with the brake actuators that is the inventive feature of this aspect of the invention. The control box is operable to send a single electronic signal to a display in the cab of the vehicle. The control box signal is indicative of at least which of the brake actuators may be evidencing excessive push rod movement. Thus, the display would indicate not only that a brake actuator needs adjustment, but would also indicate which brake actuator needs adjustment. To provide the signal from the brake actuator to the control box, each of the brake actuators are preferably provided with sensors which monitor movement of the push rods within the particular brake actuator.

In one embodiment, the control box is a microprocessor based control. The control box may be provided with a counter and a memory. These elements allow the system to monitor many conditions other than push rod movement. As an example, the counter can be utilized to monitor the period of time the brakes have remained actuated. This could provide an indication of the approximate temperature of the brake system. As the foundation brake temperature changes, the amount of push rod movement necessary to actuate the brakes could also be expected to change. Thus, the brake temperature indication provided by the counter could be factored into the determination of whether a particular brake is experiencing push rod movement. As an example, if a drum brake has been actuated for an unusually long period of time, such as when the vehicle is going down a long mountain road or steep grade, it would be expected that more push rod movement would be required for the heated and expanded drum. Under such conditions, the control box factors this element into the determination of whether a particular brake is experiencing excessive push rod movement. In that instance, what would previously be excessive push rod movement, might actually be acceptable push rod movement due to the heated condition of the brakes. The controller would be programmed to recognize the brake actuation time for the particular type of braking system and factor such information into whether an indication of excessive push rod movement should be provided to the cab display. It might be that more push rod movement would be required before an indication is set. Alternatively, the control could adjust the slack adjuster and remember to return the slack adjuster to its original position after the brake cools.

In a disk brake, when the brake temperature increases, one would expect less required push rod movement. In such a system, if the counter indicates that the brake had been actuated for such a length of time that less push rod movement is required, and there is still a greater amount of push rod movement than would be otherwise preferred, an indication of excessive push rod movement might be made. Again, the controller would be programmed to identify such a situation. In either instance, since the control box receives signals from all of the brake actuators on the vehicle, it can also compare the signals from each of the brake actuators. If only a single brake is evidencing excessive push rod movement, that could also be indicative of the need for adjustment of that brake, independent of what the brake temperature may be.

The system is preferably also capable of ensuring that the parking brakes have been fully released. As will be explained below, the sensor structure within the brake actuators is preferably capable of providing a signal of a failure to fully release the parking brake to the control box. The control box is capable of sending a signal to the display in the cab indicative of any of the brake actuators which have not fully released their parking brakes.

The memory may also be utilized to store the number of actuations of each of the brake actuators, or incremental adjustments of the slack adjusters. This could in turn provide an indication of when the expected life span of the brake linings, brake actuators, or other components of the braking system is being approached. A warning light or visual indicator could provide an indication to the operator that any one of the components in a particular brake system is approaching its expected life span.

In one embodiment of this invention, the signals are provided from the brake actuator by an arrangement wherein a plurality of magnets are mounted to the push rod, and several magnetic sensors are mounted within the housing of the brake actuator and at different planes along the axis of movement of the push rod. In a most preferred embodiment, the sensors are reed switches, which are embedded within a stone shield which surrounds the push rod. There are preferably at least three magnets, with the first magnet located at an outer position on the push rod, and the other two magnets being spaced at an inner end of the push rod. The outer magnet is positioned such that it should pass the reed switches when the parking brake is released. If the reed switches do not monitor a return passage of the outer magnet upon actuation of a parking brake release control, then a determination is made that the parking brake has not fully released. A signal is sent to the control box indicative of an unreleased parking brake.

The other two magnets are placed at an inner end of the push rod. The inner magnets are positioned such that if the reed switches monitor their passage, this is an indication of excessive movement of the push rod. Preferably, there are two inner magnets spaced from each other in the axial direction. Passage of the first magnet is read as an indication that the brake assembly is approaching a condition where maintenance may be recommended. This signal could also interface with an electronically controlled automatic slack adjuster. A worker of ordinary skill would be able to provide a slack adjuster for receiving the signal from the control and adjusting the system as required. The passage of the second magnet may provide an indication that the brake needs immediate maintenance.

In one preferred embodiment of this invention, the magnets are placed upon the push rod by utilizing flexible magnets embedded within a flexible sleeve. The sleeve is secured around the push rod. In this way, the axial position of the magnets on the push rod can be carefully controlled, and the magnets can be protected. The push rod operates in a very hostile environment, and if the magnets are not fully protected, they may be damaged. The magnets fully surround the push rod, so there is no need for precise rotational positioning.

In a method according to this invention, the condition of the brakes is constantly monitored by a single control box. The control box receives a signal from each of the brake actuators indicative of the condition of that particular brake actuator. In one preferred method, the signals are each distinct such that the control box can identify which brake is associated with each signal. In a disclosed embodiment, the distinct signals are achieved by associating a resistor with each brake actuator, with each of the resistors having different values. The resistor values change the signal. Thus, the control box is able to identify which brake and which reed switches have sent a particular signal, by identifying the particular value of that signal.

The control box is then operable to send a signal to a display in the cab. The display provides an indication of which brake is experiencing a problem condition, such as a brake needing adjustment. Further, other conditions may be monitored and displayed, such as a parking brake that is not fully released.

In another embodiment the control box is a simple electronic circuit that receives a signal from each of the brake actuators, and sends a single signal that indicates which brake or brakes are evidencing a problem. Again, unique resistor values are preferably used to provide this ability.

Finally, three specific systems are disclosed for incorporating the brake monitoring system into a vehicle. In a first embodiment, each of the brakes has a pair of jumper wires communicating its signal to a main signal feed wire. The main signal feed wire runs the length of the vehicle, picking up the jumper signal wires from each brake actuator. The main signal feed wire travels from the brake actuators to the display in the cab. The display is preferably provided with a control box that interprets the signals. Preferably, the jumper wires from each brake actuator include a resistor such that the signal from each brake actuator is unique relative to the other brake actuators. In this way, the control box can distinguish between all of the signals that will be received in combination on the single signal feed wires. Preferably, the resistors which make each brake actuator signal unique are not received within a portion of the brake actuator, but rather are received on a jumper wire between the brake actuator and the main feed wires.

In another embodiment of this invention, the signal wires from each brake actuator go to a single node for the positive and negative lines. The signal feed wires then travel from the two ganged nodes forwardly to the cab display. Again, the cab display is associated with a control that can distinguish between each of the signals from each of the brake actuators. Moreover, the jumper signal feed wires from each brake actuator are preferably passed through a unique resistor such that each brake actuator signal is different from the other brake actuator signals.

Finally, in the third embodiment of this invention, the control box is mounted on the body of the vehicle, near the brake actuators. The jumper signal wires from each brake actuator travel to the control box, and a pair of signal feed wires travels from the control box forwardly to the cab display. In this embodiment, the control box can simply know which signal is from which brake actuator by being connected to the brake actuator at an appropriate point on the control box. Alternatively, the signals from each brake actuator can still be unique.

These and other aspects of the present invention can be best understood from the following specification and drawings, of which the following is a brief description.

DETAILED DESCRIPTION OF A PREFERRED EMBODIMENT

Figure 1A:
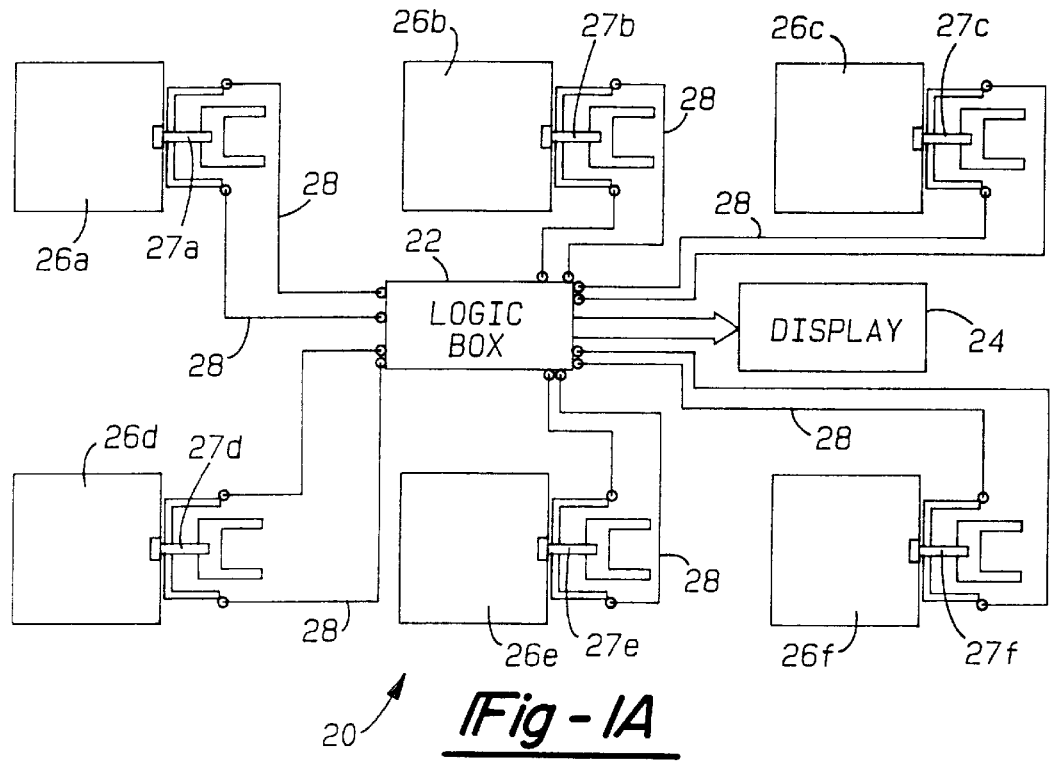
FIG. 1A is a schematic of a control for monitoring the condition of a vehicle's brakes.

A brake condition monitoring system 20 is illustrated in FIG. 1A. System 20 includes a control or logic box 22, which is mounted on the vehicle. Specific embodiments of the incorporation of the control into the vehicle will be disclosed later with reference to FIGS. 15A–15C. The basic logic in operation of the control systems will now be disclosed with reference to the specific figures. An output leads from control 22 to a display 24 that may be in the cab of a vehicle. A plurality of brake actuators 26a–26f are mounted on the vehicle body. Each of the brake actuators 26 have a push rod 27, and each of the brake actuators send a control signal 28 to the control 22.

As will be explained further below, the control 22 is able to identify which of the brake actuators 26a–26f is sending the particular signal 28a–28f, and is able to communicate each of the signals from the brake actuators 26 to the display 24 with a single signal. Thus, due to the use of the single control box 22, there need not be a bundle of wires leading from the control box to the display. This reduces the complexity of the overall system, and further increases the integrity of the system.

Figure 1B:
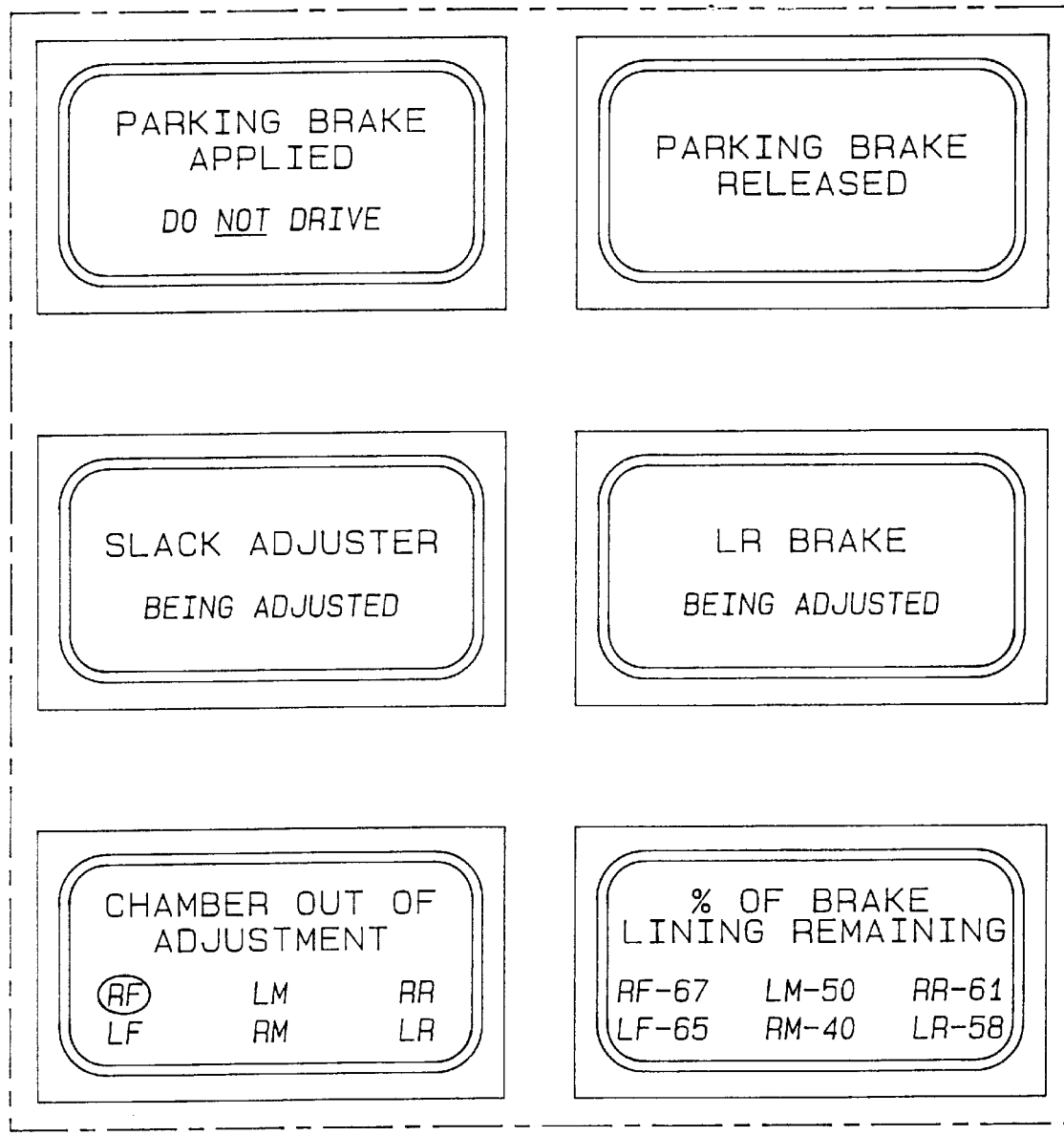
FIG. 1B shows sample cab displays.

Several sample displays 24 are shown in FIG. 1B, indicating which of the brakes may require adjustment and which of the brakes may have an unreleased parking brake. Other conditions may also be displayed, as explained below.

The display 24 shown in FIG. 1B may be a video type display wherein the operator is provided with a changing or selective report on the display. The display technology forms no position of this invention, and is well within the skill of a worker in the appropriate art. Several sample displays are shown in FIG. 1B. The displays shown indicate particular information about each particular brake actuators. Other types of displays are envisioned within the scope of this invention. The display could also indicate levels of out of adjustment for a particular brake actuator. As an example, the RF, or right front brake actuator is shown circled in FIG. 1*b*. This circle is illustrative of an indication that the right front brake actuator is evidencing a problem condition. This could be illustrated by a different color for the RF brake, or by providing some other indication such as the illustrated circle. In addition, it is envisioned that there could be levels of a problem condition evidenced by this display. As an example, the right front could be initially identified with a yellow light indicating the brake is somewhat out of adjustment. As the brake moves farther out of adjustment, the warning light could become red. In addition, audible warnings could also be incorporated into this display system.

While the parking brake release is shown as a single display, that display could further distinguish between the several brakes to indicate which brake may not be released. If a single video display is used, the system may switch cyclicly between the various displayed conditions. On the other hand, the display such as parking brake release or percentage of brake lining remaining could be actuated upon start-up of the vehicle, or upon release of the parking brake from the cab. The situation mentioned above, wherein the number of actuations of the brake or slack adjuster is stored to provide a determination of brake lining remaining is illustrated in the bottom right display. Some relationship between the number of actuations and the expected percentage of brake lining remaining could be preset and associated with the number of actuations for each system as stored in the memory.

Figure 2:
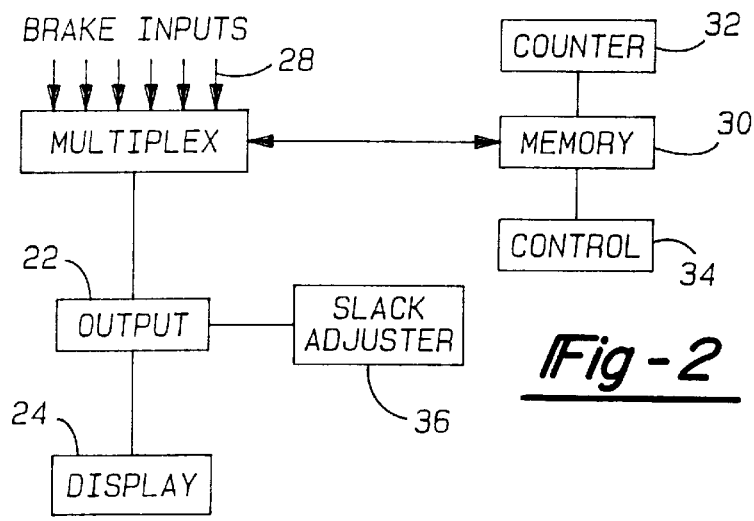
FIG. 2 is a block diagram of the control as illustrated in FIG. 1.

FIG. 2 is a block diagram of the control. As shown, the signals 28 lead into a microprocessor shown generally at 22. The microprocessor communicates with a memory 30, and a counter 32. The microprocessor also communicates with the output, which may send a signal to a slack adjuster 36. The output also sends a signal to the display 24 within the cab of a vehicle. Preferably, the outputs conform to the relevant SAE multiplex standards. As will be explained below, this block diagram is somewhat simplified. In specific embodiments, the control may be directly incorporated into the cab display. All of the signals from the brake actuators may be connected into a pair of signal feed lines leading to the display. Again, the specific systems are disclosed in FIGS. 15A–15C. A worker of ordinary skill would be able to design the particular circuit elements based upon the following functions.

The brake actuator signals 28 are preferably indicative of whether a brake needs adjustment, and whether a parking brake remains unreleased. In addition, signals 28 provide an indication of when a brake is actuated. The memory 30 can store a record of the number of actuations of each brake actuator, or the number of adjustments of the slack adjuster. This can be used to predict expected life span for the brakes, the slack adjuster, the linings, or the brake actuators. As an example, the number of slack adjuster actuations would be related to a percentage of brake lining wear, as displayed in FIG. 1B. The counter or memory can preferably be manually reset as the linings are replaced.

In addition, the memory 30 monitors the period of time a particular brake has been actuated. In some instances, such as when a truck is going down a long mountain road, the brakes may be actuated for unusual lengths of time. In such situations, the brake temperature may increase. This situation is preferably accounted for when determining whether to indicate a particular brake needs adjustment. The microprocessor assists in making these determinations, and is preferably capable of monitoring the length of time that a brake has been actuated, and determining whether a particular amount of excessive movement of a push rod would require adjustment. A worker of ordinary skill in the art would recognize how to adjust the determination of whether a particular brake needs adjustment, based upon brake temperature. As explained above, this determination must consider the type of brake, among other factors. The control may also communicate this information to a control for anti-lock brakes.

The slack adjuster interface 36 may be connected to an automatic slack adjuster that is electronically actuated in response to a signal from control 22. The slack adjuster then adjusts when the brake is experiencing excessive push rod movement.

Figure 3:
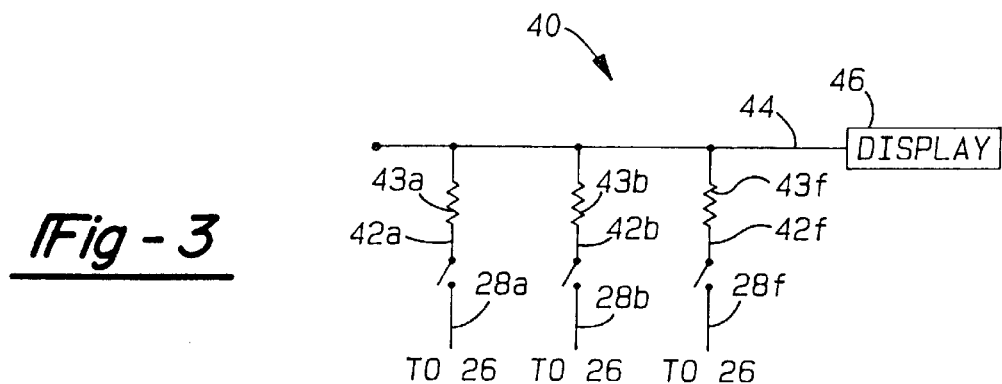
FIG. 3 is a view of an alternative control.

FIG. 3 shows a simplified control 40 that may replace the microprocessor control 22. Control 40 receives signals 28, and communicates each of those signals to a separate switch 42a–42f. The switches 42 are connected in parallel as shown in FIG. 3. A resistor 43a–43f is connected in series with each switch 42a–42f. The signals 28 activate each switch 42. Thus, the output signal seen at 44 would be indicative of which switches 42 have been actuated by a signal from their respective brake actuators. Each signal is modified by one of the resistors 43. The output 44 is connected to the display 46. The resistors 43a–43f are preferably selected so that they each have a unique value. The output 44 is thus unique for each combination of brakes 43a–43f that have sent a signal 28. By referencing the unique value of the signal at 44, a display would be able to identify which of the brake actuators 26 have sent a signal. This would be a simplified system from that shown in FIG. 2, and would be primarily capable of indicating excessive movement of the push rods. The system illustrated in FIGS. 1 and 2 would be better equipped to monitor conditions other than excessive push rod movement.

Figure 4:
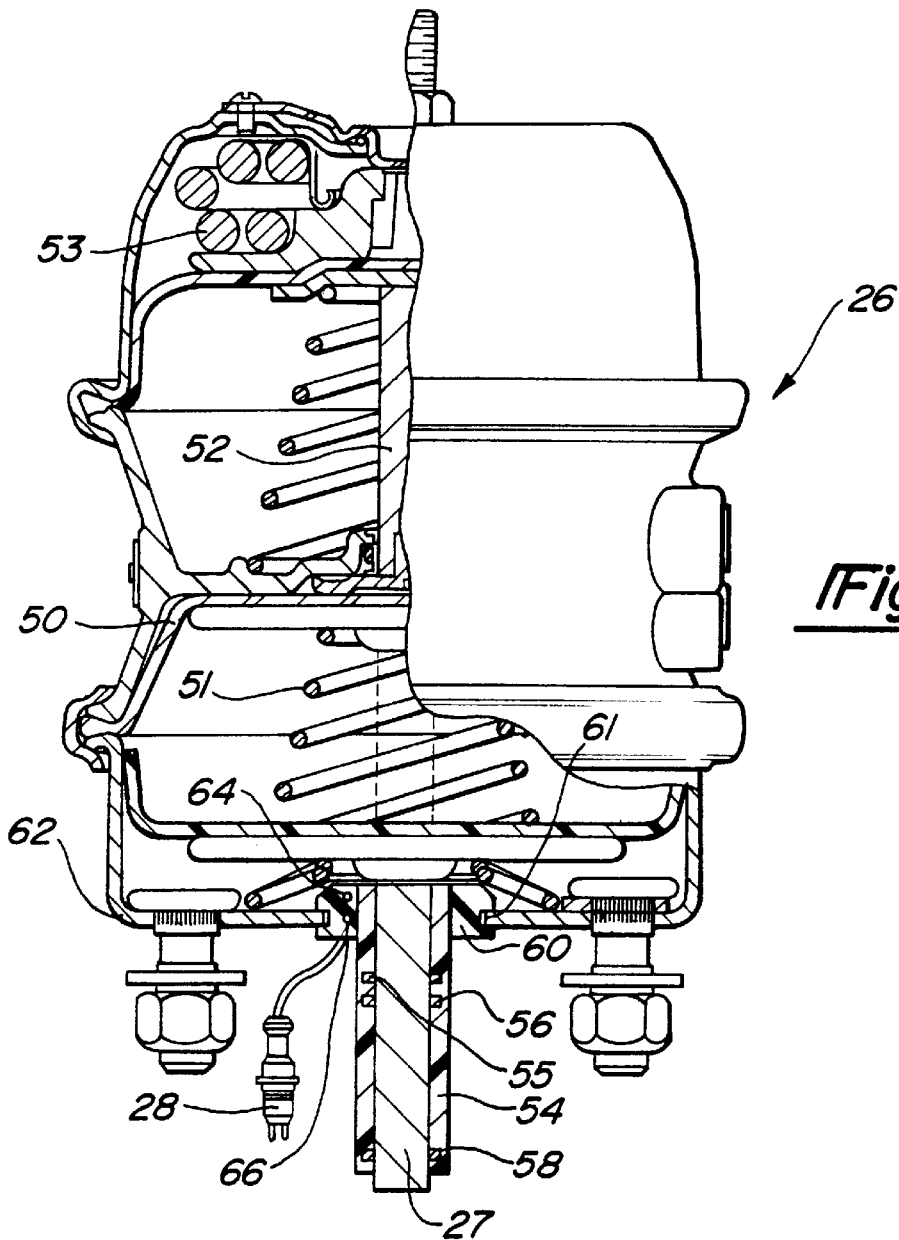
FIG. 4 is a cross-sectional view of a brake actuator according to the present invention.

FIG. 4 shows a brake actuator 26 incorporating the present invention. As is known, a brake actuator incorporates a diaphragm 50, which drives the push rod 27. A return spring 51 moves the diaphragm 50 upwardly, moving the brake to a non-actuated position. When air is supplied above the diaphragm 50, the diaphragm moves downwardly in FIG. 4, forcing the push rod 27 outwardly of the brake chamber.

In the disclosed embodiment, an emergency or parking brake push rod 52 is mounted above the diaphragm 50. A large power spring 53 is operable to force the push rod 27 outwardly and set the brake. The spring 53 is actuated when there is a failure in the vehicle air system, or when an operator actuates the parking brake.

In a monitoring system according to this invention, a sleeve 54 is mounted about the radially outer surface of the push rod 27. The sleeve 54 in the disclosed embodiment carries three spaced magnets 55, 56 and 58. Magnet 58 is located adjacent to one end of the sleeve 54, and magnets 55 and 56 are more closely spaced adjacent an inner end of the sleeve 54.

A stone shield 60 incorporates a radial groove 61 which is snapped onto an opening in the housing 62. Stone shield 60 receives two reed switch sensors 64 and 66, as shown in FIG. 4. Groove 61 includes a clearance to allow lateral motion to accommodate angular articulation of the push rod. Sensors 64 and 66 are operable to sense relative movement of the magnets 55, 56 and 58.

Figure 5:
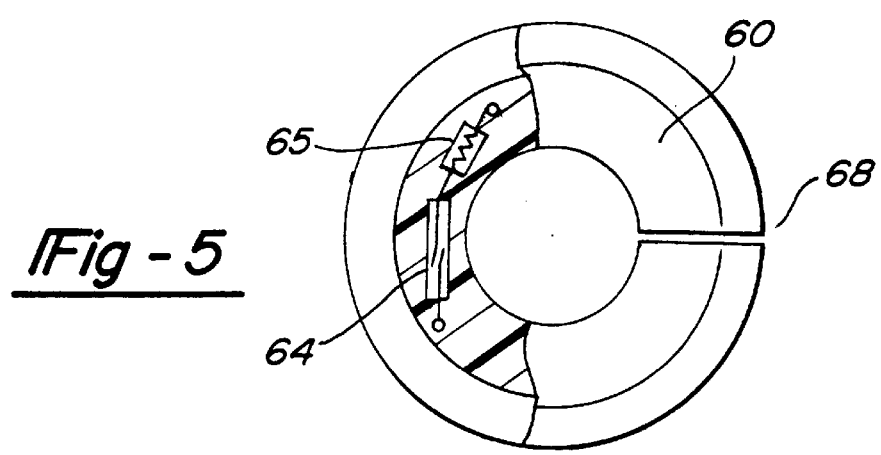
FIG. 5 is a view of the stone shield of the embodiment of FIG. 4.

As shown in FIG. 5, the stone shield 60 has a resistor 65 embedded in series with the reed switch 64. A similar resistor is embedded in series with the reed switch 66. The resistors associated with the switches 64 and 66 preferably each have a unique value. The two reed switches are then connected in parallel. Thus, when the control 22 receives a signal 28, by referencing the voltage of that signal, the control box can identify which reed switch has sent the signal. Moreover, the control will be able to identify various combinations of actuated reed switches.

While it is possible that each of the resistors associated with each of the brake actuators has a unique value such that the signal will be unique for any combination of actuated switches on any of the brake actuators, that is not the most preferred embodiment. Such an embodiment will require that unique stone shields be prepared and made available for each particular brake actuator. This would make maintaining an adequate inventory at maintenance shops somewhat impractical. Instead, it is preferred that the signal line 28 will receive a resistor which will be unique for each brake actuator. Thus, when the control studies the signal from each brake actuator, the specific resistor value will have changed that signal such that the control will be able to identify which brake actuators have actuated switches.

As also shown in FIG. 5, a slot 68 is formed within the stone shield 60. Slot 68 facilitates placement of the stone shield 60 within the housing 62. Stone shield 60 is preferably formed of a relatively rigid plastic material, such as nylon. Slot 68, which also allows replacement of the sensors without brake disassembly.

Figure 6:
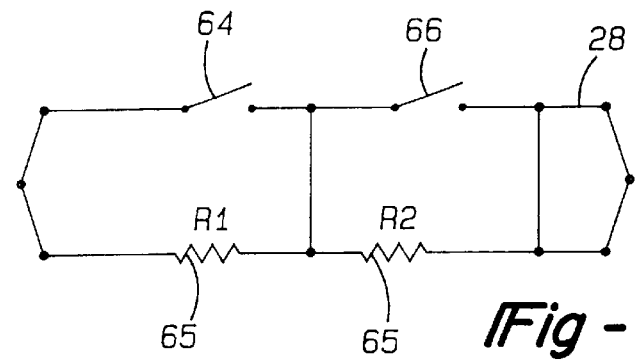
FIG. 6 is a schematic of alternate electronics incorporated into the FIG. 4 stone shield.

While the reed switches and resisters shown in the stone shield of FIG. 5 are in a series, other arrangements may be utilized. With the series mounting of the resistor and switch, the two switches 64 and 66 should be mounted in parallel. The control could then study the combined signal from the two switches and determine whether either of the two switches are actuated, or whether both are actuated. An alternative to this arrangement is illustrated in FIG. 6. FIG. 6 is a preferred circuit as it will provide a signal even when no switches are actuated. As shown in FIG. 6, the resistors 65 are connected in parallel relative to the switches 64 and 66. The switches 64 and 66 are mounted in series. Should a switch be open, then the signal would pass through the associated resistor 65. Should a switch be closed, then the signal would take the path of least resistance, and by-pass the associated resistor 65. The output 28 is thus indicative of which of the switches 64 or 66 have been actuated due to the voltage seen at 28. If a resistor 65 is bypassed, that would be indicated by the value of the signal at 28. At the same time, even when both switches 64 and 66 are opened, a signal would be displayed at 28. That signal would be the signal affected by both of the resistant values R1 and R2. If the control 22 does not receive a signal from a particular brake actuator, that can be seen as an indication that the signal wire 28 from the particular brake actuator has become disconnected.

Figure 7:
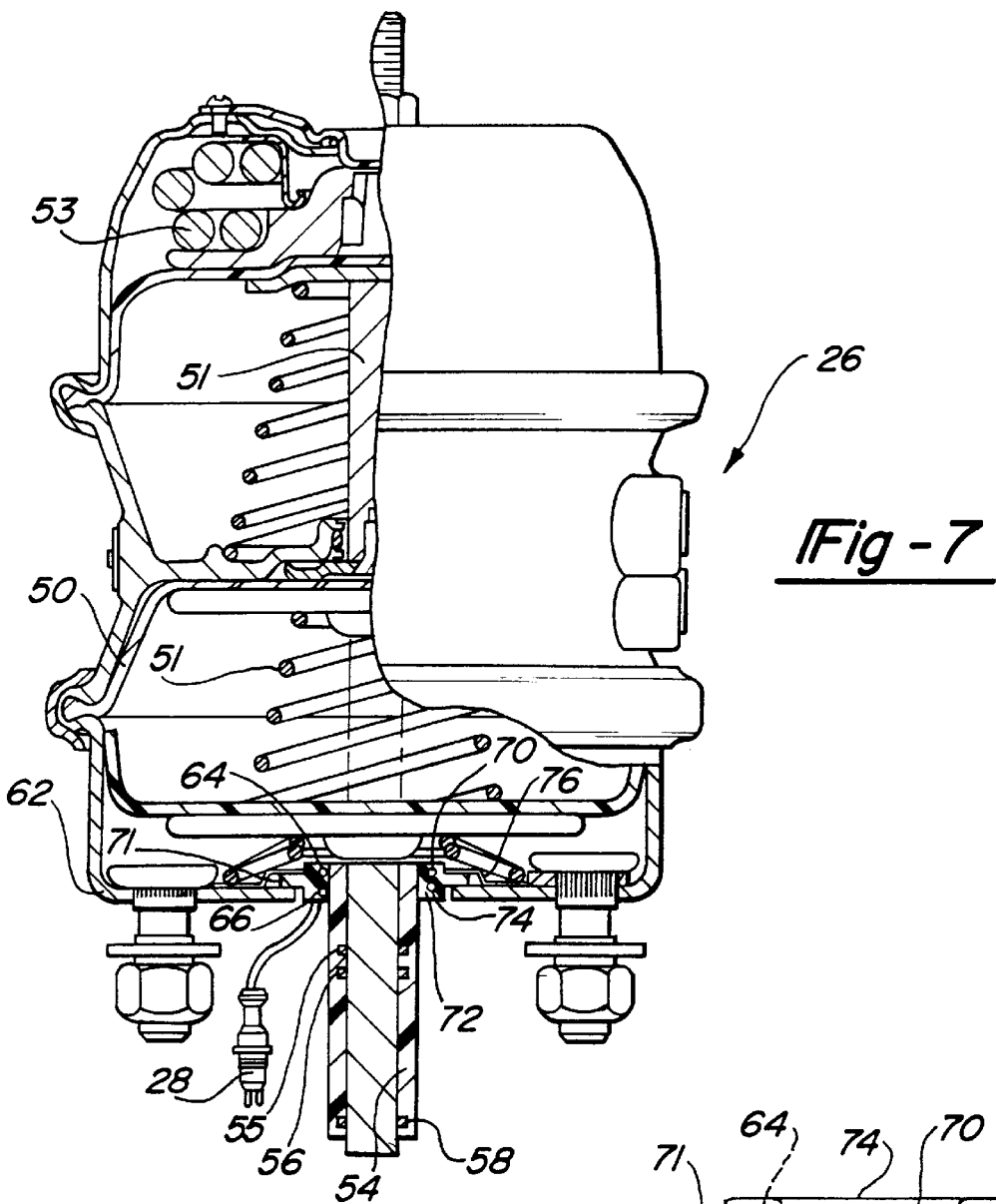
FIG. 7 is a cross-sectional view of an alternative embodiment brake actuator according to the present invention.

An alternative stone shield 70 is illustrated in FIG. 7. In stone shield 70, an outer peripheral surface 71 rests upon a surface of the housing 62. The stone shield also has a portion 72 extending downwardly into the opening in the housing 62. An upper portion 74 of the stone shield extends upwardly through an opening in a stone shield retainer 76. The stone shield 70 floats within retainer 76 to allow lateral motion of the stone shield with any angular articulation of the push rod. The stone shield 70 incorporates reed switches 64 and 66 as in either prior embodiment.

Figure 8:
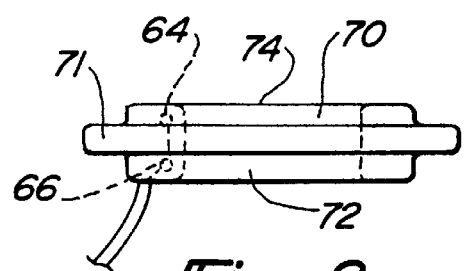
FIG. 8 is a cross-sectional view through the stone shield of FIG. 7.
Figure 9:
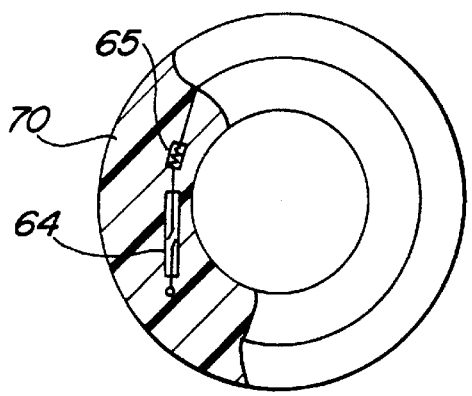
FIG. 9 is a top view of the stone shield shown in FIG. 8.

FIGS. 8 and 9 show details of the stone shield 70. As shown, the reed switches 64 and 66 are embedded within the radial width of the stone shield. As shown in FIG. 9, a resistor 65 is associated with the switch 64. A similar resistor is associated with the switch 66.

Figure 10:
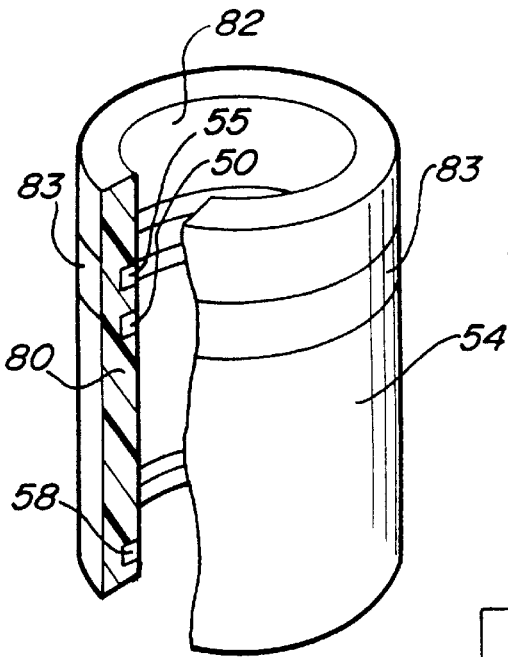
FIG. 10 is a view of a sleeve containing magnets for mounting on a push rod according to the present invention.

FIG. 10 shows a detail of the sleeve 54. Sleeve 54 preferably is formed of a flexible nylon having a slot 82 to allow the sleeve 54 to be wrapped around the push rod. At an inner peripheral surface of the sleeve 54, the magnets 55, 56 and 58 are mounted in molded grooves. The sleeve is preferably attached to the push rod by an adhesive. Preferably, the like poles of the magnets 55 and 56 are aligned with each other. In that way, the magnetic fields generated by the magnets 55 and 56 are directed radially outwardly away from the adjacent magnet poles. This provides better separation between the two magnets, limiting the potential for the reed switches to be unable to distinguish between passage of each magnet. Preferably, the magnets are also flexible magnets that surround the push rod. Thus, rotational alignment of the push rod and switches 64 and 66 is not important. Suitable magnets are available under the trade name Plastiform™ from Arnold Engineering Co. of Norfolk, Nebraska. A brightly colored band 83 could also be placed on the outer surface of sleeve 54 to provide a visual indication that the brake requires adjustment.

Figure 11:
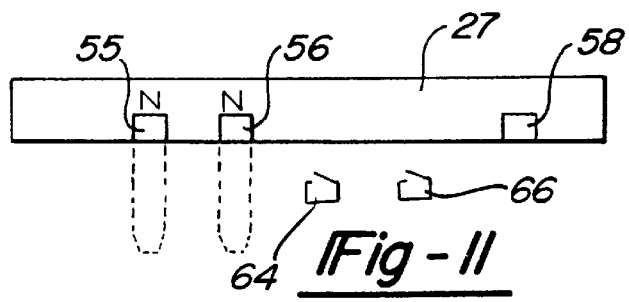
FIG. 11 schematically shows a first brake condition.

The operation of one of the sensors associated with one of the brake actuators will now be described with reference to FIGS. 11–14. FIG. 11 shows a situation in which the parking brake has not yet been released. The inner magnets 55 and 56 are spaced inwardly relative to the two switches 64 and 66. The switches 64 and 66 are thus shown open. With the circuit shown in FIG. 6, the signal 28 would pass through both resistors 65. The signal will be cumulative of both resistors and will be read by control 22 as an indication of neither switch 64 or 66 being actuated. At the same time, the memory associated with the control remembers the sequence and history of actuations and "knows" that the outer magnet 58 has not yet passed the switches 64 and 66. The position of the magnet 58 is selected such that when the parking brake is fully released the magnet 58 will have moved beyond at least one of the switches 64 and 66. If the magnet 58 has not passed those switches, a determination is made by the control that the parking brake is not fully released. Thus, when the condition illustrated in FIG. 10 is encountered, and the parking brakes should have been released, the control 22 will send a signal to the display 24 that the parking brake associated with the particular brake actuator has not yet been fully released. In one logic for making this determination, the controller may monitor whether each of the brake actuators has sent a signal indicative of the outermost switch 66 being actuated. Any brake that has not provided such a signal can be determined as not having had the outer magnet 58 pass the switch 66, and could thus be diagnosed as having a parking brake which is not fully released. This logic will also provide an indication of whether a return spring has broken. Similarly, the control can monitor whenever a brake is actuated to determine whether the magnet 58 has moved beyond the switches 64 and 66, and determine whether a particular brake is not being actuated. If five of the six brakes 26 are providing an indication that their brakes have been actuated, and a sixth brake is not providing such a signal, a determination can be made that a problem exists with that sixth brake. The problem might be in the actuation or structure of the brake, or it may be in the monitoring system for the brake. The same logic will provide indications relative to the operation of the brake structure. The vehicle operator will know, however, to check that particular brake actuator and determine where the problem lies. In addition, the counter will allow an indication of brake actuation speed by monitoring passage of the magnets.

Also illustrated in FIG. 11, the poles of the magnets 56 and 55 are aligned with respect to each other. The magnetic fields from the two magnets 55 and 56 will thus resist movement towards each other, and move directly radially outwardly, as shown in phantom. This provides a distinct gap between the fields associated with the two magnets 55 and 56, and will better insure that the switches 64 and 66 are able to distinguish between the two magnets 55 and 56.

Figure 12:
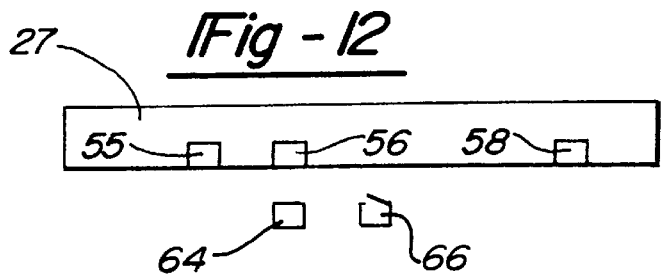
FIG. 12 schematically shows a second brake condition.

A situation indicative of a brake needing adjustment is shown in FIG. 12. Inner switch 64 is actuated since the magnet 56 has approached the switch 64. With the FIG. 6 circuit, the unique resistor 65 associated with the switch 64 will be bypassed, and not be part of the signal sent to the control 22. The control will identify the value of the particular signal 28 and recognize that switch 64 is closed. Control 22 will then provide an indication to a driver in the cab that the brake in question may need adjustment in the near future. The control may also send a signal to the slack adjuster as described above.

Figure 13:
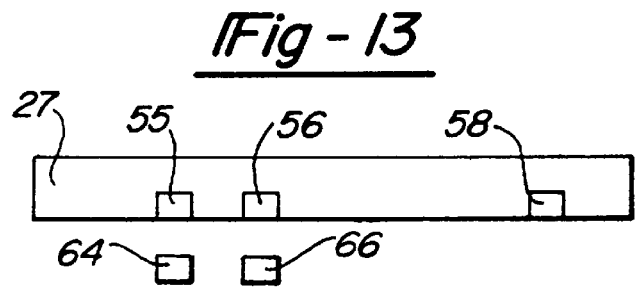
FIG. 13 schematically shows a third brake condition.
Figure 14:
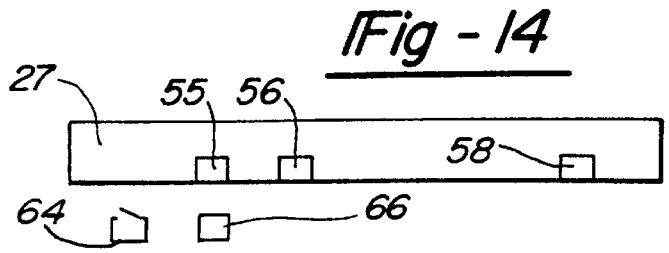
FIG. 14 schematically shows a fourth brake condition.

FIG. 13 shows a condition wherein the inner magnet 55 has now actuated the switch 64. This may be seen at the same time the magnet 56 may have actuated the switch 66. With the FIG. 6 circuit, both resistors will now be bypassed. This may be indicative that the brake requires more immediate adjustment. Similarly, if the situation shown in FIG. 14 is encountered with the switch 64 is open but the magnet 55 has actuated the switch 66, that could be seen as a signal that the brake requires immediate adjustment. Greater numbers of magnets or switches can be incorporated to provide more gradations of control, or different functions. Since the switches are mounted in different planes, the number of positions that can be sensed increases geometrically with each new switch.

The memory preferably recalls the position and movement of the magnets 55, 56 and 58 relative to the switches 64 and 66, and makes a determination of where the magnet should be in relation to the switches 64 and 66, based upon the expected status of the particular brake actuator. In this way, the control 22 can determine when a brake is actuated. As an example, movement of the magnet 58 beyond the switches 64 and 66 can be taken as a signal indicative of an actuation. The controller 22 will thus be able to keep a count of the number of actuations of the brake, and the counter will be able to monitor the period of time of actuation for the particular amount of brake. As explained above, if a brake has been actuated for an unusually long period of time, the brake temperature may increase which might affect the question of whether a particular brake push rod movement is indicative of a need of adjustment.

Suitable reed switches are available from Hamlin Inc. of Lake Mills, WI as product number MD-SR-7.

A method according to the present invention includes continuously monitoring signals from each of the brake actuators 26a–26f associated with the vehicle at the control box 22. The control box 22 is operable to receive the signals 28 and make determinations as to whether a particular brake needs adjustment or repair. The determinations are displayed on the display 24 on the vehicle cab. The display provides the operator not only with an indication that some brake needs adjustment or repair, but also provides an indication of which brake requires adjustment or repair. In addition, other conditions may be monitored by the control 22 and appropriate signals sent to the display 24.

Figure 15A:
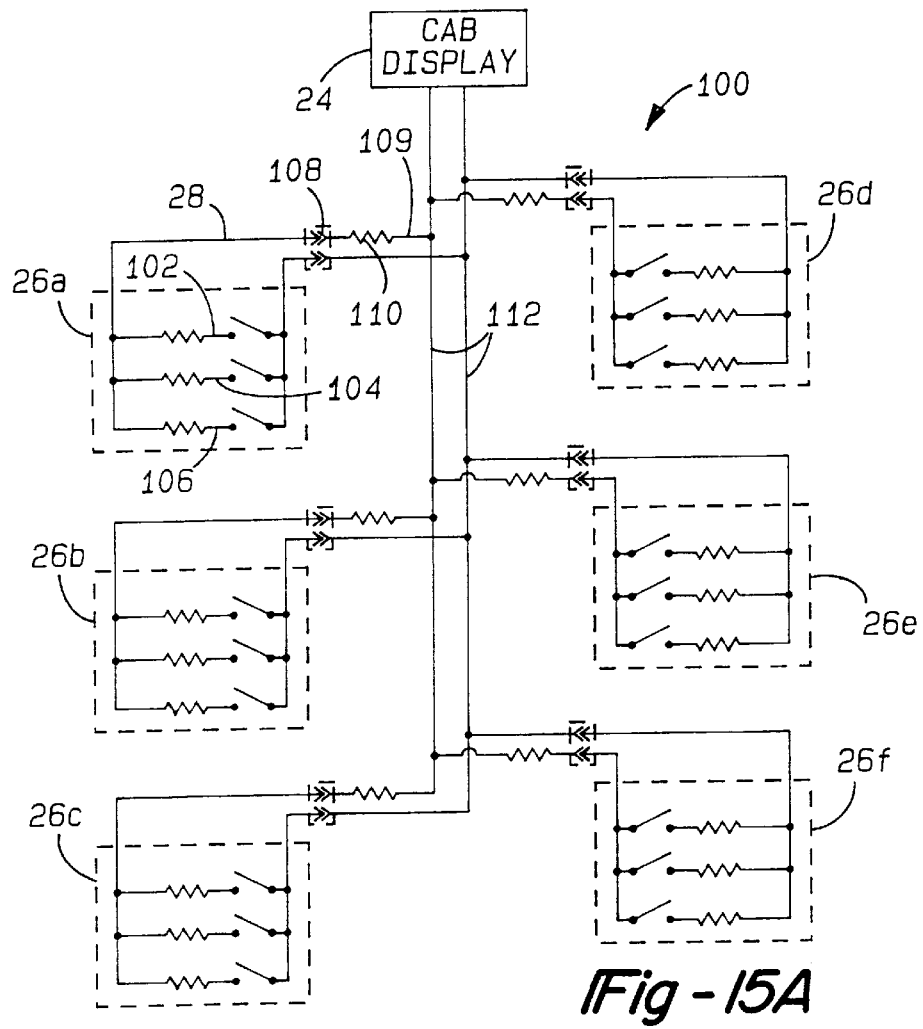
FIG. 15A is a first embodiment control system.
Figure 15B:
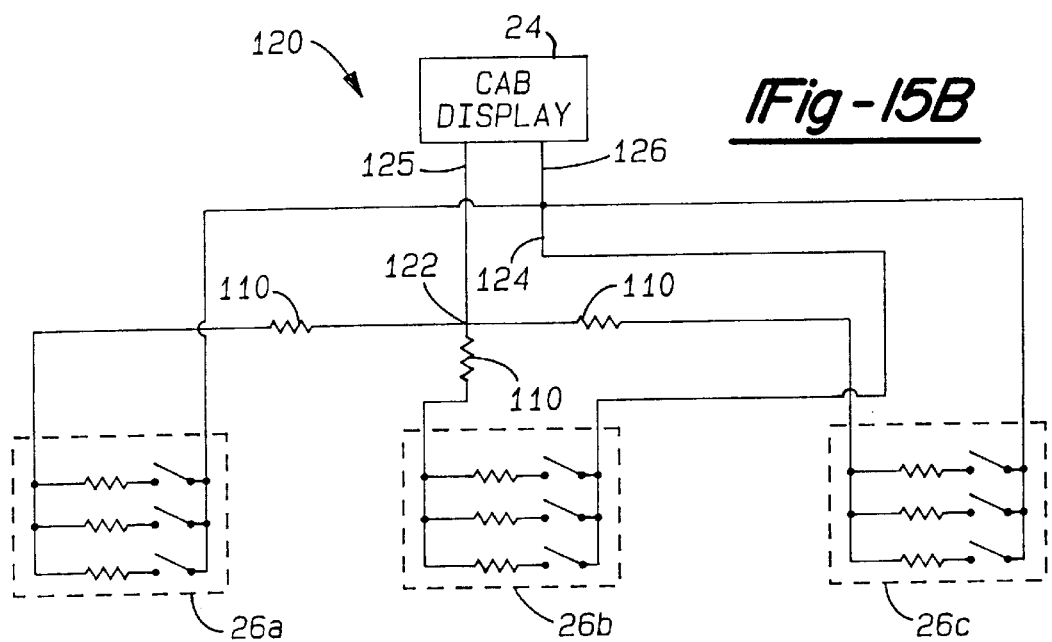
FIG. 15B shows a second embodiment control system.
Figure 15C:
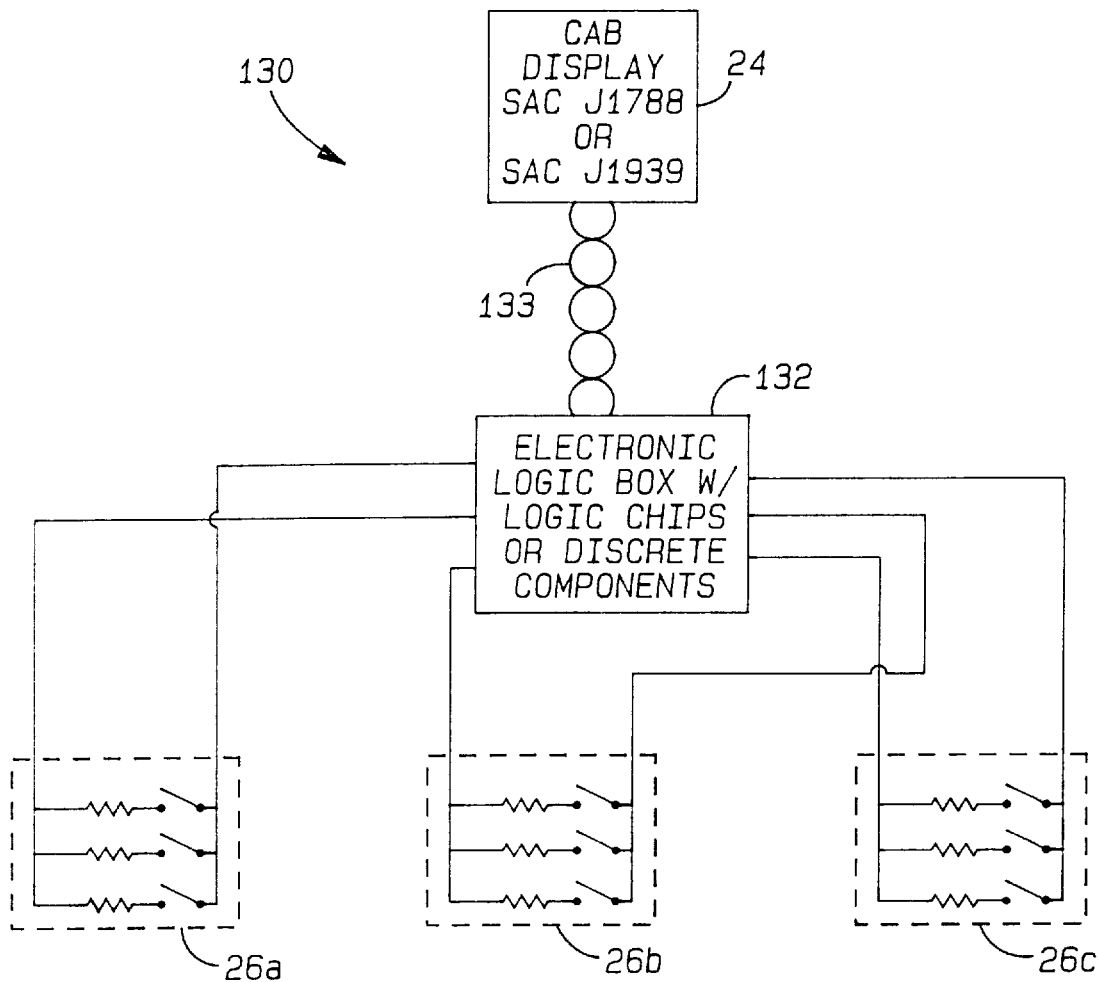
FIG. 15C shows a third embodiment brake system.

As shown in FIGS. 15A–15C, there are several possible arrangements for incorporating the inventive systems into a vehicle. As shown in FIG. 15A, a first system 100 includes a plurality of signal wires 28 leading from a plurality of brake actuators 26a14 26f. Each of the brake actuators 26 includes three resistors and associated switches 102, 104, and 106. Although only two switches are shown in the previously disclosed embodiments, it should be understood that three switches, such as is shown in this embodiment, or even more switches are within the scope of this invention. The switches 102, 104, and 106 preferably have resistors of different value associated with them. Moreover, all of the switches 102, 104, and 106 are preferably embedded into a stone shield associated with each brake actuator 26. As shown, a connector 108 connects the signal wires 28 to jumper signal wires 109. A resistor 110 is mounted in each jumper signal wires 109. A pair of signal feed wires 112 pick up each of the jumper signal wires 109 and travel forwardly to the cab display 24. The cab display incorporates a control which can interpret the signal from the feed signal wires 112. That signal will be unique for each potential combination of actuated switches 102, 104, and 106 and for each of the brake actuators 26a–26f, due to the unique values of the resistors 110. The resistors 110 across each of the brakes 26a–26f should be selected such that any combination of switches 102, 104, and 106 and any of the brakes will provide a unique value. The selection of appropriate resistor values to allow this identification is well within the skill of a worker in the art.

FIG. 15B shows another embodiment 120 wherein each of the brake actuators 26 has its signal wires extending through its resistor 110 and then being connected to a pair of ganged nodes 122 and 124. Although only three brake actuators are shown in this figure to simplify the illustration, it should be understood that, typically, there would be more brake actuators associated with any real world system. The signal feed wires 125 and 126 extend forwardly from nodes 122 and 124 to the cab display 24. The cab display 24 will incorporate a control which can interpret the signals in the signal feed wires 124 and 125. Again, due to the unique values of the resistor 110, the signal found within the signal feed wires 125 and 126 will be unique for any combination of actuated brakes and switches.

Finally, FIG. 15C shows an embodiment 130, again, with only three brake actuators to simplify the illustration. Here, too, it should be understood that there would typically be several more brake actuators in any real world vehicle. In this embodiment, each of the brake actuators is connected to an electronic logic box 132. Signal feed wires 133 extend forwardly to the cab display 24. These wires are typically twisted to prevent reception and transmission of noise in the wires or interference from electronic logic box 132 to cab display 24. In this embodiment, resistors 110 are not shown, although they could be incorporated into this system. Instead, the logic box 132 would recognize by the location of the connection which brake actuator is sending a particular signal.

Several embodiments of this invention have been disclosed. A worker of ordinary skill in the art would recognize, however, that other modifications would come within the scope of this invention. For that reason the following claims should be studied to determine the true scope and content of this invention.

We claim:

1. A vehicle brake condition monitoring system, comprising:

a plurality of brake actuators mounted on a body of a vehicle, each of said brake actuators having a push rod actuatable to apply a brake;

sensors associated with each of said brake actuators to monitor movement of said push rods, and sense a problem condition based upon excessive movement of said push rod;

a control box mounted on a vehicle receiving a signal from said sensors of each of said brake actuators, said control box having signal wires from each of said brake actuators attached at a particular location, such that said control box can identify which brake actuator is sending a particular signal, and said control box being operable in response to said signals to determine which of said brake actuator signals are indicative of a problem condition, said control also being operable to send an output signal indicative of which of said brake actuator signals are evidencing problem conditions;

a display in a cab of said vehicle, and an output leading from said control to said display; and said control monitoring at least one brake condition other than the movement of said push rod, said other condition being whether a parking brake has been fully released.

2. A system as recited in claim 1, wherein said control includes a microprocessor.

3. A system as recited in claim 1, wherein said other condition includes said control being provided with a counter, and the length of brake actuation time being monitored by said control.

4. A vehicle brake condition monitoring system, comprising:

a plurality of brake actuators mounted on a body of a vehicle, each of said brake actuators having a push rod actuatable to apply a brake;

sensors associated with each of said brake actuators to monitor movement of said push rods, and sense a problem condition based upon excessive movement of said push rod;

a control box mounted on a vehicle receiving a signal from said sensors of each of said brake actuators said control box having signal wires from each of said brake actuators attached at a particular location, such that said control box can identify which brake actuator is sending a particular signal. and said control box being operable in response to said signals to determine which of said brake actuator signals are indicative of a problem condition, said control also being operable to send an output signal indicative of which of said brake actuator signals are evidencing problem conditions:

a display in a cab of said vehicle, and an output leading from said control to said display; and wherein said control monitors at least one brake condition other than movement of said push rod, said other condition including said control being provided with a counter, and a length of brake actuation time being monitored by said control, the brake actuation time is utilized to provide an indication of expected brake temperature, which is in turn utilized to control the decision of whether a particular amount of push rod movement is indicative of a brake actuator needing adjustment.

5. A system as recited in claim 1, wherein said other condition is whether the return spring in the service chamber of said brake actuator is broken.

6. A system as recited in claim 1, wherein said display in said cab also provides an indication of said other condition.

7. A vehicle brake condition monitoring system, comprising:

a plurality of brake actuators mounted on a body of a vehicle, each of said brake actuators having a push rod actuatable to apply a brake;

sensors associated with each of said brake actuators to monitor movement of said push rods, and sense a problem condition based upon excessive movement of said push rod:

a control box mounted on a vehicle receiving a signal from said sensors of each of said brake actuators, said control box having signal wires from each of said brake actuators attached at a particular location, such that said control box can identify which brake actuator is sending a particular signal, and said control box being operable in response to said signals to determine which of said brake actuator signals are indicative of a problem condition, said control also being operable to send an output signal indicative of which of said brake actuator signals are evidencing problem conditions;

a display in a cab of said vehicle, and an output leading from said control to said display; and wherein said control monitor at least one brake condition other than movement of said push rods, said other condition including said control being provided with a counter, and a length of brake actuation time being monitored by said control, said other condition includes providing a memory of the number of actuations of a portion of the system associated with each brake actuator.

8. A system as recited in claim 7, wherein adjustments of the slack adjuster are stored, and associated with an expected percentage of brake lining remaining.

9. A vehicle brake condition monitoring system, comprising:

a plurality of brake actuators mounted on a body of a vehicle, each of said brake actuators having a push rod actuatable to apply a brake;

sensors associated with each of said brake actuators to monitor movement of said push rods, and sense a problem condition based upon excessive movement of said push rod;

a control box mounted on a vehicle receiving a signal from said sensors of each of said brake actuators, said control box having signal wires from each of said brake actuators attached at a particular location, such that said control box can identify which brake actuator is sending a particular signal, and said control box being operable in response to said signals to determine which of said brake actuator signals are indicative of a problem condition, said control also being operable to send an output signal indicative of which of said brake actuator signals are evidencing problem conditions;

a display in a cab of said vehicle, and an output leading from said control to said display; and wherein said other condition including said control being provided with a counter, and a length of brake actuation time being monitored by said control, said other condition is a comparison by said control of the signals from each of said brake actuators to provide an indication of whether one of said signals is not evidencing a brake actuation when the other signals are.

10. A system as recited in claim 1, wherein said display in said cab further provides an indication of at least two levels of excessive push rod movement.

11. A vehicle brake condition monitoring system, comprising:

a plurality of brake actuators mounted on a body of a vehicle, each of said brake actuators having a push rod actuatable to apply a brake;

sensors associated with each of said brake actuators to monitor movement of said push rods, and sense a problem condition based upon excessive movement of said push rod;

a control box mounted on a vehicle receiving a signal from said sensors of each of said brake actuators, said control box having signal wires from each of said brake actuators attached at a particular location, such that said control box can identify which brake actuator is sending a particular signal, and said control box being operable in response to said signals to determine which of said brake actuator signals are indicative of a problem condition, said control also being operable to send an output signal indicative of which of said brake actuator signals are evidencing problem conditions;

a display in a cab of said vehicle, and an output leading from said control to said display; and wherein said display also provides an indication of whether a parking brake has been released.

12. A system as recited in claim 1, wherein said sensor in said brake actuator includes a reed switch.

13. A system as recited in claim 12, wherein there are two of said reed switches in each brake actuator, and at least three magnets mounted on each of said push rods.

14. A system as recited in claim 13, wherein a flexible sleeve carries said three magnets and is received on said push rod.

15. A system as recited in claim 14, wherein said magnets are flexible and extend around an inner periphery of said sleeve to surround said push rod.

16. A system as recited in claim 14, wherein at least two of said three magnets are mounted adjacent each other, and the poles of said two adjacent magnets being aligned with respect to each other.

17. A system as recited in claim 1, wherein said sensor is incorporated into a stone shield, said stone shield being received about said push rod in each of said brake actuators, said brake actuators including a housing with an opening, said push rod moving through said opening, said stone shield extending radially inwardly from a radially innermost portion of said opening.

18. A vehicle brake condition monitoring system, comprising:

a plurality of brake actuators mounted on a body of a vehicle, each of said brake actuators having a push rod actuatable to apply a brake;

sensors associated with each of said brake actuators to monitor movement of said push rods, and sense a problem condition based upon excessive movement of said push rod;

a control box mounted on a vehicle receiving a signal from said sensors of each of said brake actuators, said control box having signal wires from each of said brake actuators attached at a particular location, such that said control box can identify which brake actuator is sending a particular signal, and said control box being operable in response to said signals to determine which of said brake actuator signals are indicative of a problem condition, said control also being operable to send an output signal indicative of which of said brake actuator signals are evidencing problem conditions;

a display in a cab of said vehicle. and an output leading from said control to said display;

wherein said sensor is incorporated into a stone shield, said stone shield being received about said push rod in each of said brake actuators, said brake actuators including a housing with an opening, said push rod moving through said opening, said stone shield extending radially inwardly from a radially innermost portion of said opening; and said stone shield incorporates a slot at one position to facilitate removal of said stone shield from said housing without complete disassembly of said brake actuator.

19. A system as recited in claim 18, wherein said stone shield includes a groove at an outer peripheral surface, said groove being received on said opening to secure said stone shield to said housing.

20. A system as recited in claim 17, wherein said stone shield includes a first portion received within said opening, and a second holder portion.

21. A system as recited in claim 1, wherein said control is received on a body of said vehicle, and a pair of signal feed wires lead from said control to said display in said cab.

22. A vehicle brake condition monitoring system comprising:

a plurality of brake actuators mounted on a body of a vehicle, each of said brake actuators having a push rod actuatable to apply a brake, sensors mounted within each of said brake actuators to monitor movement of said push rods and sense a problem condition based upon excessive movement of said push rod;

a control receiving a signal from said sensor of each of said brake actuators, said control being operable to determine which said brake actuator signals are indicative of a problem condition, said control also being operable to send an output signal indicative of which of said brake actuators are evidencing problem conditions;

a display in a cab of said vehicle, a single signal wire leading from said control to said display;

wherein said control utilizes a microprocessor and said signals from each of said brake actuators being distinct, such that said control can identify which of said brake actuators is providing a particular signal; and said control monitoring at least one brake condition other than excessive movement of said push rod from said signals, said other condition being whether the parking brake has been fully released.

23. A system as recited in claim 22, wherein said sensor in said brake actuator includes a reed switch.

24. A system as recited in claim 22, wherein said other condition includes said control being provided with a counter, and the length of brake actuation time being monitored by said control.

25. A system as recited in claim 24, wherein the brake actuation time is utilized to provide an indication of expected brake temperature, which is in turn utilized to control the decision of whether a particular amount of push rod movement is indicative of a brake actuator needing adjustment.

26. A system as recited in claim 22, wherein said other condition is whether the return spring in the service chamber of said brake actuator is broken.

27. A system as recited in claim 22, wherein said other condition includes providing a memory of the number of actuations of a portion of the systems associated with each brake actuator.

28. A system as recited in claim 27, wherein the adjustments of the slack adjuster are stored, and associated with an expected percentage of brake lining remaining.

29. A system as recited in claim 22, wherein said other condition is a comparison by the control of said signals from each of said brake actuators to provide an indication of whether one of said signals is not evidencing a brake actuation when the others are.

30. A system as recited in claim 22, wherein said sensors include two magnetic switches in each brake actuator, and at least three magnets mounted on said push rod.

31. A system as recited in claim 30, wherein a flexible sleeve carries said three magnets and is received on said push rod.

32. A system as recited in claim 31, wherein said magnets are flexible and extend around an inner periphery of said sleeve to surround said push rod.

33. A system as recited in claim 31, wherein at least two of said three magnets are mounted adjacent each other, and the poles of said two adjacent magnets are aligned with respect to each other.

34. A system as recited in claim 22, wherein said signal from each of said brake actuators passing through a resistor having a unique value for each of said brake actuators, and the unique value of the signal passing through the resistor for each of said brake actuators allowing said control to determine which of the brake actuator signals are indicative of a problem.

35. A system as recited in claim 22, wherein said control is mounted on said body of the vehicle, and a pair of signal feed wires lead from said control to said display.

36. A system for monitoring the condition of a brake actuator comprising;
   at least one brake actuator including a push rod for actuation of a brake, and sensors for monitoring the condition of the brake actuator and its components, said sensors being capable of monitoring the movement of said push rod associated with said brake actuators, and providing a signal indicative of excessive movement of said push rod;
   a control for monitoring signals from said brake actuator, said control being operable to provide a signal to a display when said push rod exhibits excessive movement as sensed by said sensor, and wherein said control is also capable of monitoring at least one other condition of said brake actuator in addition to excessive push rod movement based upon said signals: and
   said other condition being whether the parking brake has been fully released.

37. A system as recited in claim 36, wherein said other condition includes said control being provided with a counter, and the length of brake actuation time being monitored by said counter.

38. A system as recited in claim 36, wherein the brake actuation time is utilized to provide an indication of expected brake temperature, which is in turn utilized to control the decision of whether a particular amount of push rod movement is indicative of a brake actuator needing adjustment.

39. A system as recited in claim 36, wherein said other condition is whether the return spring in the service chamber of said brake actuator is broken.

40. A system as recited in claim 36, wherein said display displays the monitored additional condition.

41. A system as recited in claim 36, wherein there are a plurality of said brake actuators, each of said brake actuators sending a signal to said control, signals from each of said brake actuators having a unique value such that said control can distinguish between signals from said plurality of brake actuators.

42. A system as recited in claim 41, wherein said display in said cab also provides an indication of said other monitored conditions, and which brake is evidencing said other condition.

43. A system as recited in claim 36, wherein said other conditions includes providing a memory of the number of actuations of a portion of the systems associated with each brake actuator.

44. A system as recited in claim 43, wherein the adjustments of the slack adjuster are stored, and associated with an expected percentage of brake lining remaining.

45. A system as recited in claim 36, wherein said other condition is a comparison by the control of the signals from each of the brake actuators associated with the vehicle to provide an indication of whether one of the signals is not evidencing a brake actuation when the others are.

46. A sleeve for use with a push rod for an air actuated brake actuator comprising:
   a flexible sleeve for surrounding a push rod; and
   a plurality of magnets mounted within said flexible sleeve, said magnets being flexible, and extending around said sleeve to surround the push rod.

47. A sleeve as recited in claim 46, wherein there are at least two of said magnets mounted adjacent to each other, and the poles on said two of said magnets are aligned with respect to each other.

48. A sleeve as recited in claim 47, wherein there is a third of said magnets spaced farther from said other two adjacent ones of said magnets.

49. A sleeve as recited in claim 46, wherein there are at least three of said magnets, with one of said magnets being spaced farther away from the other two of said magnets, and the other two of said magnets being spaced closer to each other.

50. A brake actuator comprising:
   a housing including an opening at one end, said housing including a diaphragm dividing said housing into at least two chambers;
   a push rod received in one of said chambers and in contact with said diaphragm and said push rod extending through said opening;
   a stone shield surrounding said push rod, and received within said opening, said stone shield extending radially inwardly from a radially innermost portion of said opening; and
   a sleeve surrounding said push rod, said sleeve including a plurality of magnets, a plurality of magnetic sensors received within said stone shield to sense movement of said magnets.

51. A system as recited in claim 50, wherein said sleeve is a flexible sleeve that has a slot at one circumferential location, said slot facilitating placement of said sleeve over said push rod, and there being a plurality of said magnets at an inner peripheral surface of said sleeve.

52. A system as recited in claim 51, wherein said magnets are flexible magnets.

53. A system as recited in claim 52, wherein said sleeve is secured to said push rod by an adhesive.

54. A system as recited in claim 51, wherein a visual indicia is placed on an outer surface of said sleeve to provide an indication of excessive movement of said push rod.

55. A system as recited in claim 50, wherein said magnetic sensors are reed switches.

56. A method of monitoring the condition of the brakes on a vehicle comprising:
   a. providing sensors within the brake actuators associated with the vehicle;
   b. providing a control for receiving a brake actuator signal from each of said sensors, and providing a single output signal from said control to a display mounted in the cab of the vehicle, said output signal distinguishing between said brake actuator signals from each of said brake actuators;

c. monitoring movement of a push rod within each of said brake actuators, and providing said brake actuator signal indicative of excessive movement of any one of said push rods to said control, said control providing said output signal to said display indicative of which brake actuators are experiencing excessive push rod movement, said control sending said output signal to said display; and d. said control also monitoring another condition of the brake actuator based upon said signals, said other condition being whether the parking brake has been fully released.

57. A method as recited in claim 56, wherein said other condition is monitoring the amount of time that the particular brake actuator has been actuated.

58. A method as recited in claim 56, wherein said control stores the number of actuations for each of said brake actuators, and said number of actuations is said other monitored condition.

59. A method as recited in claim 56, wherein said control stores the number of adjustments of a slack adjuster associated with each of said brake actuators, and the number of stored adjustments is said other monitored condition and is utilized to provide a prediction of remaining brake lining.

60. A method as recited in claim 56, wherein said control monitors whether a particular brake actuator evidences a brake actuation, and compares the signal to all of the other brake actuators to determine whether each has evidenced a brake actuation, and providing a signal should one of said brake actuators not evidence a brake actuation.

61. A method as recited in claim 56, wherein said brake actuator signal is provided with a resistor having a value unique for each of said brake actuators such that the signal for each of said brake actuators is unique from the other signals of said brake actuators, and said control being able to determine which brake actuator is sending a signal, or which combination of said brake actuators is sending signals based upon the unique combination of resistances evidenced in any signal.

62. A method as recited in claim 61, wherein said signal wires from each of said brake actuators extend to a pair of common signal feed wires, said pair of common signal feed wires leading forwardly to a cab of said vehicle, and said control and said display both being received in said cab of said vehicle.

63. A vehicle brake condition monitoring system comprising:

a plurality of brake actuators mounted on a body of a vehicle, each of said brake actuators having a push rod actuatable to apply a brake;

sensors associated with each of said brake actuators to monitor movement of said push rods and sense a problem condition based upon excessive movement of said push rod;

a control receiving a signal from said sensors of each of said brake actuators, said signal having a unique value for each of said brake actuators, said control being operable in response to said signals to determine which of said brake actuator signals are indicative of a problem condition, said control also being operable to send an output signal indicative of which of said brake actuator signals are evidencing problem conditions;

a display in a cab of said vehicle, an output leading from said control to said display, said control also being mounting in the cab of said vehicle; and resistors associated with each of said brake actuators, said resistors changing the value of the signal from said brake actuator such that the signal from each said brake actuator is unique, and the signals from each of said brake actuators being connected to a pair of common signal feed lines leading from the body of said vehicle forwardly to said cab and into said control, the signal passing through said common feed lines being indicative of which of said brake actuators are evidencing a problem condition due to the unique resistors associated with each of said brake actuators.

64. A system as recited in claim 63, wherein said sensors associated with said brake actuators are mounted within a stone shield received within a housing of said brake actuator, said sensors communicating a signal through an electrical connection line, said electrical connection line being connected to a jumper signal wire leading from said brake actuator to said signal feed lines, and said unique resistor being received within said jumper signal wire line.

* * * * *